July 4, 1933.  T. M. HUNTER  1,916,218
ROTARY WELDING TRANSFORMER
Filed Jan. 12, 1931  3 Sheets-Sheet 2
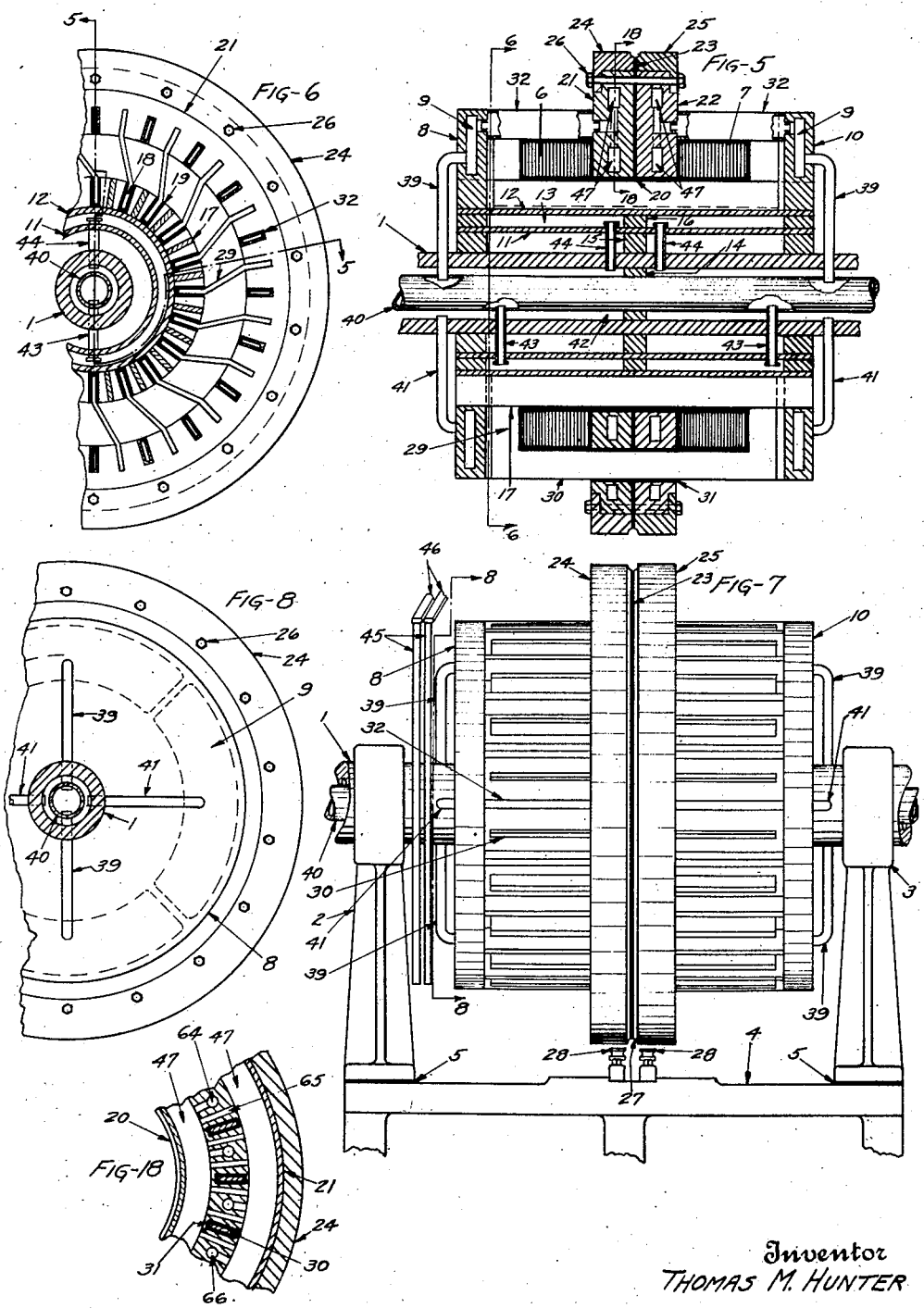
Inventor
THOMAS M. HUNTER
Attorney A. D. T. Libby July 4, 1933.    T. M. HUNTER    1,916,218
ROTARY WELDING TRANSFORMER
Filed Jan. 12, 1931    3 Sheets-Sheet 3
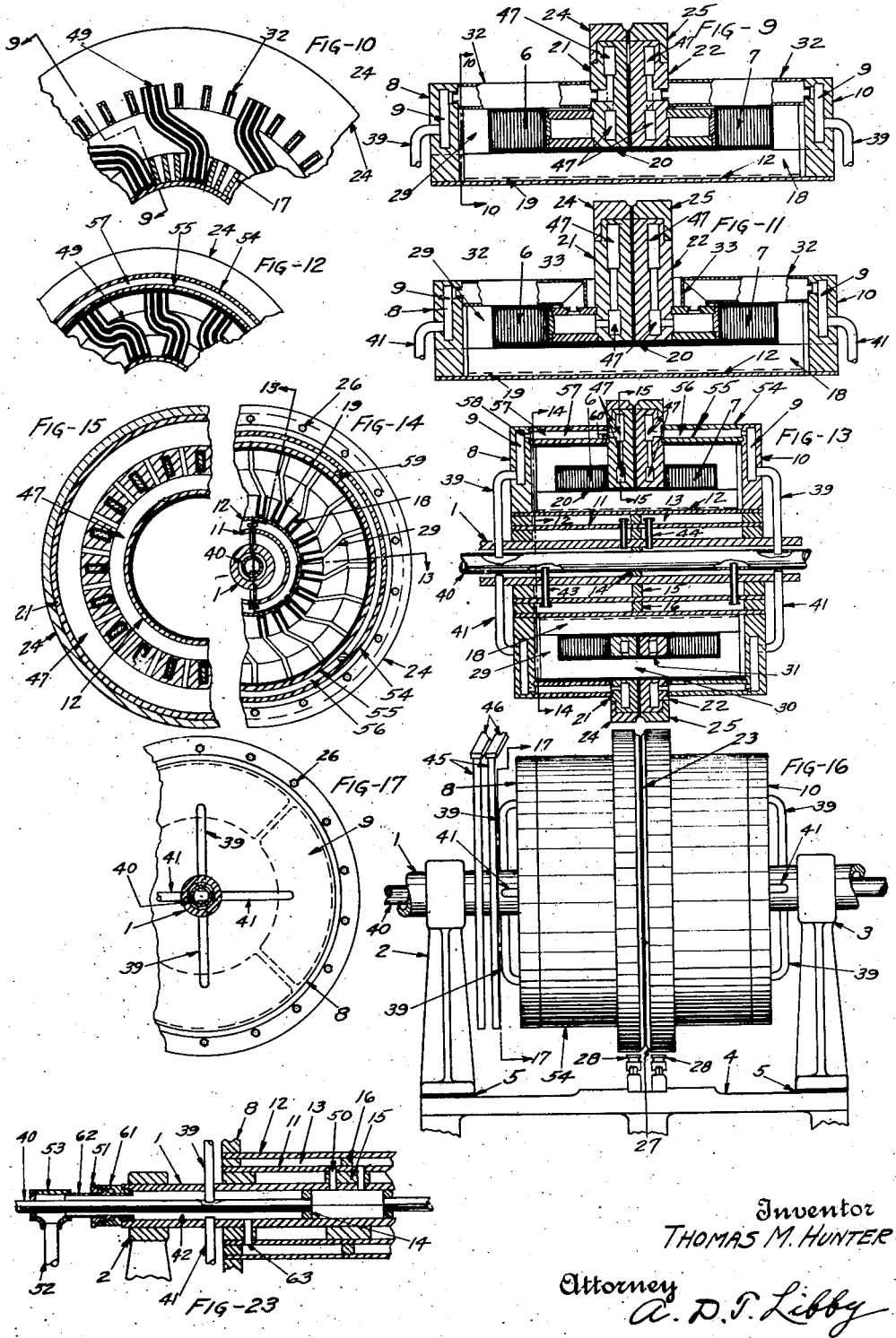
Inventor
THOMAS M. HUNTER
Attorney
A. D. T. Libby Patented July 4, 1933

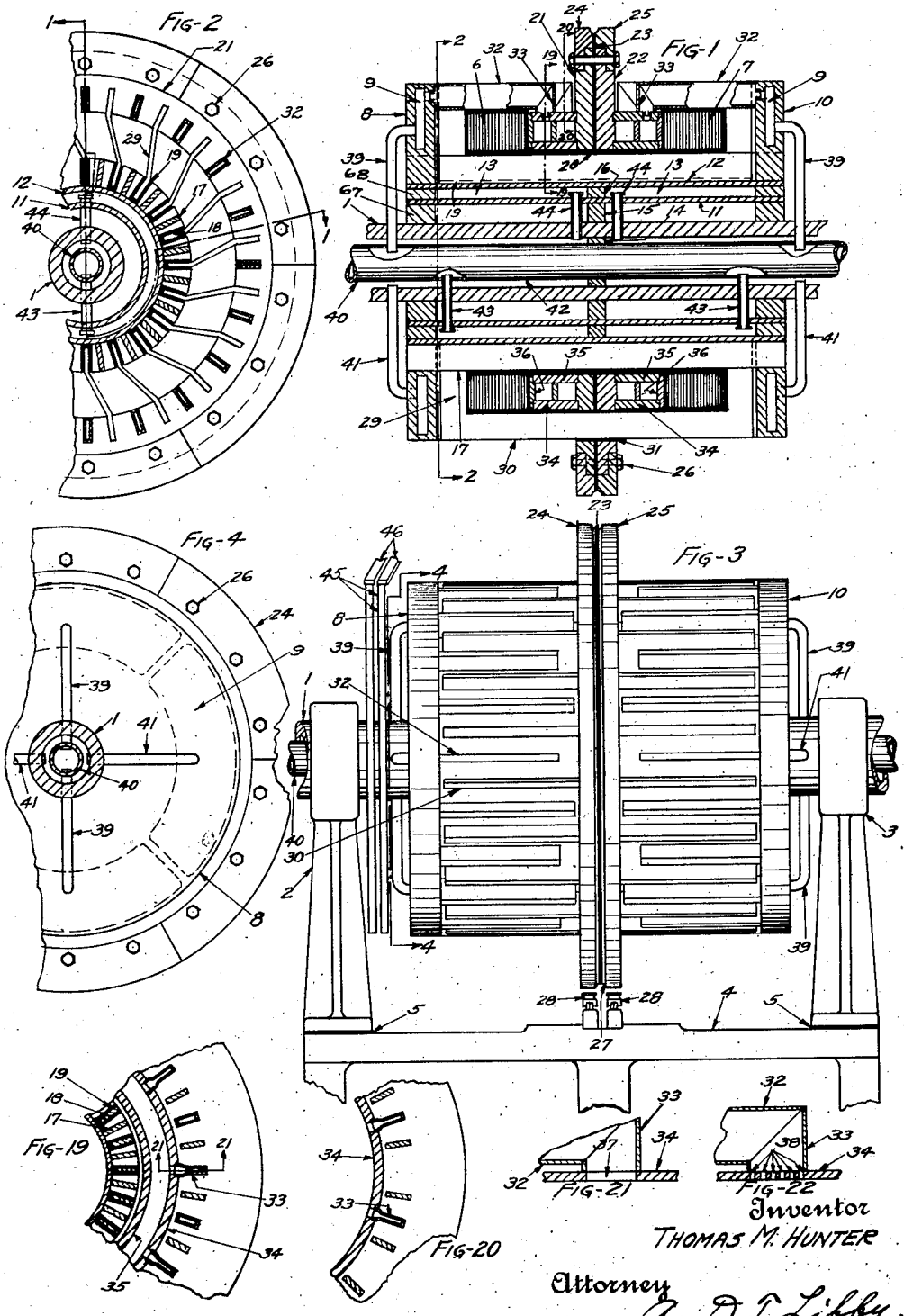

1,916,218

UNITED STATES PATENT OFFICE

THOMAS M. HUNTER, OF EAST ORANGE, NEW JERSEY

ROTARY WELDING TRANSFORMER

Application filed January 12, 1931. Serial No. 508,121.

This invention relates to a rotary type of transformer particularly adapted for use in welding tubing.

It is one of the objects of my invention to provide a tube welding transformer in which the parts are disposed so as to be able to convey a very heavy current to the tube engaged by the contact rings or rollers, thereby making it possible to weld tubing having a relatively thick wall, it being understood that the heating effect is proportional to the square of the current.

Another object is to provide a rigid support for the welding rolls so that heavy pressure can be used to squeeze the seams of the tube together. This is particularly desirable when a lap joint is employed.

Another object of my invention is to provide a design of rotary tube welding transformer in which the parts are symmetrically arranged whereby the mechanical and electrical losses are held to a minimum.

A further object of my invention is to provide a design of rotary welding transformer in which attention is given to the matter of cooling so that a large welding current may be utilized for continuous operation of the transformer.

These and other objects will be apparent to those familiar with the design and operation of rotary welding transformers, after a study of the specification taken in connection with the annexed drawings, wherein:

Figure 1 is a vertical sectional view through the transformer on the line 1—1 of Figure 2.

Figure 2 is a part-sectional view on the line 2—2 of Figure 1.

Figure 3 is a longitudinal elevation of the transformer showing part of the frame for supporting it, some parts being omitted.

Figure 4 is a partial view on the plane 4—4 of Figure 3.

Figure 5 is a view similar to Figure 1 on the line 5—5 of Figure 6, but showing a modified form of construction.

Figure 6 is a part-sectional view on the line 6—6 of Figure 5.

Figure 7 is a longitudinal elevation of the transformer shown in Figure 5, including part of the supporting frame.

Figure 8 is a view on the plane 8—8 of Figure 7.

Fig. 9 is a sectional view on the line 9—9 of Figure 10 of the upper part of a modified form of transformer.

Figure 10 is a fragmentary section through the transformer of Figure 9 on the lines 10—10, but showing grouping of conductors.

Figure 11 is a view similar to Figure 9 taken 90° arcuately away.

Figure 12 is a section on the line 12—12 of Figure 13, showing how the primary conductors may be grouped into coils.

Figure 13 is a longitudinal section on the line 13—13 of Figure 14, showing a still further modified form of construction.

Figure 14 is a part-sectional view on the line 14—14 of Figure 13.

Figure 15 is an enlarged sectional view on the line 15—15 of Figure 13.

Figure 16 is a side elevation of the transformer shown in Figure 13, showing part of the frame support.

Figure 17 is a part end-elevation on the plane 17—17 of Figure 16.

Figure 18 is a fragmentary section on the line 18—18 of Figure 5.

Figure 19 is a fragmentary section on the line 19—19 of Figure 1.

Figure 20 is a fragmentary section on the line 20—20 of Figure 1.

Figure 21 is a fragmentary section on the line 21—21 of Figure 19.

Figure 22 is a fragmentary view of a modified construction of that shown in Figure 21.

Figure 23 is a view of one form of construction for the inlet and outlet of the cooling fluid for the transformer.

Referring now to the details wherein like numbers refer to corresponding parts in the various views, 1 is a hollow shaft of a rotary transformer supported in any suitable manner as by pedestals 2 and 3 supported on a base 4 but preferably insulated therefrom as by insulators 5. The shaft is preferably mounted on roller bearings and is usually turned by the passage of the tube to be welded in contact with the welding rolls, although power may be aplied directly to the shaft but synchronized with the tube driving mechanism.

In the form of tube welding transformer disclosed herein, the core is preferably an annular one and arranged in two sections 6 and 7 spaced a suitable distance apart. The two sections are preferably identical and symmetrically constructed and arranged with respect to the shaft 1 and the supports 2 and 3.

Mounted on the shaft 1, opposite the outer end of the core section 6, is a disc 8 having one or more cooling chambers 9 therein. Carried on the opposite end of the shaft 1, is another disc 10 similar to the disc 8 and having one or more similar chambers 9 therein. The discs 8 and 10 are supported on annular spacers 67 and 68 which in turn support a pair of metallic tubes 11 and 12 of suitable material, the tube 12 preferably being of copper and of a larger diameter than the tube 11, thereby forming a cooling space 13 between the tubes. The central part of the tubes 11 and 12 is supported by collars 14, 15, and 16, the annular collar 16 really separating the cooling space 13 into two parts. The tube 11 may in some cases be omitted and the cooling space 13 will then include the space between the tube 12 and the shaft.

Resting on the outer tube 12, are the inner parts of the primary and secondary conductors which loop around the entire core sections 6 and 7. These conductor portions are preferably in bar form, rectangular in shape, set edgewise as shown in Figure 2, and are of good conducting metal such as copper. The portions 17 of the secondary loops have their ends fastened in any satisfactory manner, as by welding or brazing, to the discs 8 and 10 as shown in Figure 1; while the corresponding loop portions 18 of the primary, which are placed in intermingled relationship with the corresponding loop portions 17 of the secondary, are insulated from the tube 12 by a suitable insulator 19.

Resting on these inner portions of the looped turns, but insulated therefrom by an insulator 20, are a pair of roller contact rings 21 and 22 which are separated one from the other by an insulator 23. The rings 21 and 22 are preferably symmetrically spaced laterally betwen the core sections 6 and 7, and are preferably provided with contact shoes 24 and 25 preferably made in sectors as shown in Figure 4, and fastened to the rings 21 and 22 in any satisfactory maner as by bolts 26 insulated from the rolls. Since a heavy current is required in the welding of tubes, particularly tubes having a thick walls, these quick detachable shoes are quite essential as they may be readily removed without dismantling any other part of the transformer, it being understood that in use the shoes wear out more or less due to the friction and heat from the pipe. It may be noted at this point that the tube to be welded is held in the groove 27 by means of pressure rolls 28 carried on the frame 4.

The inner portions 18 of the primary loops are provided with risers 29 which pass between the core sections 6 and 7 and the discs 8 and 10 as shown in the lower part of Figure 1, and these risers form an integral part of the bar portion 30, which it is to be noted, passes directly through openings provided in the two parts 21 and 22 of the contact rolls, but insulated therefrom as by insulators 31.

The disc 8 is joined to the roller 21 by a special construction in the form of hollow bar conductors 32 having one end joined to the disc 8 and the other end turned downwardly at 33 and joined to a tube 34 spaced between the core section 6 and the contact roller 21. Positioned inwardly of the tube 34 and resting on the insulator 20, is another tube 35, thereby forming a cooling chamber between the tubes 34 and 35, it being understood that the tubes 34 and 35 are welded to the roll 21 so as to produce a fluid-tight joint, and have the part adjacent the core 6 sealed by an annular plate 36.

In the form shown in Fig. 1, the alternate conductors 32 have their ends joined to the tube 34 in offset relationship as shown.

The method of connecting the hollow conductors 32 to the disc 8 and the tube 34 may take a number of different forms, one such being indicated in Figure 21, wherein a hole 37 of substantially the same area as the cross-sectional area of the passageway in the conductor 32, is provided, the end 33 abutting against the outer surface of the tube 34 and being welded thereto.

In the form shown in Figure 22, a plurality of holes 38 may be provided in the wall of the tube 34.

As an alternative method of making connection with the tube 34, the end of the conductor 32 may be swaged and welded into engagement with the tube 34 in the manner shown in Figures 19 and 20. The connections between the disc 10 and the contact roller 22 are made in a similar manner. As has been stated, each of the discs 8 and 10 is preferably provided with a plurality of chambers, alternate ones being connected by a pipe 39 with a cooling fluid supply pipe 40, the other chambers being connected by pipes 41 to a space 42 between the pipe 40 and the shaft 1, whereby the cooling fluid may be taken away, or the reverse flow of cooling fluid may take place.

After passing into the chambers 9, the fluid is forced through the conductors 32 and into the chamber between the pipes 34 and 35 and out into the alternate chambers 9 as referred to. At the same time, the cooling fluid is passed by pipes 43 to the space 13 between the tubes 11 and 12, and returned by the pipes 44 to the space 42, thereby passing cooling fluid to the space 13 on both sides of the support member 16, thus conveying heat away from the inner portions of the loop conductors.

It is thus seen that the contact rings 21 and 22 form the terminals for the secondary of the transformer. Current is conveyed to the primary through the medium of a pair of slip rings 45 and brushes 46. In the views shown, for the purpose of clarity, the connection between the slip rings 45 and the primary conductors is not shown, but it is to be understood that they are connected in any satisfactory manner.

In Figures 5 to 8 inclusive, the tubes 34 and 35 used for cooling, are omitted and each of the contact rolls 21 and 22 is provided with cooling chambers 47, and the conductor ends 32 are joined in any satisfactory manner to their respective contact rings. The connections between the chambers 47 in either of the contact rings 21 and 22 may be made in the manner as indicated by Figure 18, through the openings 64, 65, and 66.

In Figure 9 is shown a construction which is a combination of that shown in Figures 1 and 5, while Figure 11 is similar to Figure 9, only the section is taken 90° angularly to show how the cooling fluid is passed through the rolls, the fluid being taken in, for example, in the quadrants shown in Figure 9 and passed out via quadrant chambers, Figure 11.

From these Figures, as well as Figures 13 to 17 inclusive, it will be seen that the detail construction of passing the cooling fluid through the various portions of the machine may be varied to a considerable extent.

In Figures 10 and 12, I have indicated how the primary conductors may be bunched in groups 49 and these groups placed in intermingled relationship with the secondary conductors. In certain designs such an arrangement may be found advisable.

In Figure 13, the outer loops of the secondary are composed of a pair of annular tubes 54 and 55 arranged on opposite sides of the welding rolls 21 and 22, thereby forming cooling chambers 56 and 57. The cooling fluid is passed to these chambers through openings 58 into chambers 9 separated by spacers 59 (see Fig. 14); also the fluid is passed to chambers 47 in the rolls by means of openings 60. In Figure 23, the end of shaft 1 is provided with a stuffing box 61 and nut 51 and sleeve 62 to which is attached a T-fitting 53 having a pipe 52 fastened thereto for taking away the cooling fluid. The fluid is fed to the cooling chamber 13 by way of opening 50 in the annular support member 15 which is made somewhat wider than shown in Figure 1. The fluid passes out of chambers 13 via opening 63 into the hollow shaft 1, out through sleeve 62 and pipe 52. In fact, this form of passing the cooling fluid into the parts of the machine may be used in all the designs shown, opposite ends of the transformer being similarly equipped.

In the design of this tube welding transformer, it will be seen that the parts are arranged so that if a plane is passed through the insulator 23 between the two discs 21 and 22, the two halves of the transformer are symmetrical, thereby producing a rotary machine which is mechanically and electrically balanced insofar as it is possible to balance the latter. By splitting up the secondary into a plurality of conductors, the eddy current losses are enormously reduced.

The arrangement of the welding rolls in this design provides a relatively short path for the current generated by the conductors farthest from the point where the roll contacts with the tube to be welded, and by arranging the conductors in the manner described, I have provided a maximum coupling between the primary and secondary turns and caused the secondary current to travel the entire path around the core parallel with the primary turns before it gets to the tube to be welded, thereby increasing the mutual inductance and efficiency of the machine.

Disposing the parts symmetrically in the manner described and supporting the welding contact rolls in the center of the transformer, evenly distributes the weight and mechanical pressure produced in the welding operation on the shaft and bearing, and the machine can thus be constructed with similar bearings. These advantages, together with the removable contact shoes and cooling features, I believe to be entirely new in a machine of this character.

From what has been said, it will be understood that many of the details may be varied without departing from the spirit of my invention or the scope of the appended claims.

Having thus described my invention, what I claim is:

1. A rotary transformer including an annular core, arranged in two spaced sections, a primary and a secondary winding formed of looped conductors placed in intermingled relationship, one with the other, around the core, a two-part electrode wheel positioned between the core sections and forming the terminals of the secondary, means for rotating the transformer, and means for passing current through said primary.

2. A rotary transformer including an annular core, arranged in two spaced sections, a primary and a secondary winding formed of looped conductors around the core, a two-part electrode wheel positioned between the core sections and forming the terminals of the secondary, means for rotating the transformer, and means for passing current through said primary.

3. A rotary transformer including an annular core arranged in two spaced sections, a two-part electrode wheel positioned between the core sections, a primary winding formed of conductors looped around the core, the outer turns of the loops passing through but being insulated from said wheel parts, a secondary winding formed of conductors looped around the core in intermingled relationship with the primary loops and having their opposite ends connected to the respective parts of said wheel which thereby become the terminals of the secondary, means for rotating the transformer, and means for passing current through said primary.

4. A rotary transformer including a core arranged in two spaced sections, primary and secondary windings on the core, and a pair of roller contact rings positioned between the sections of the core and forming terminals for the secondary.

5. A rotary transformer including a core arranged in two spaced sections, primary and secondary windings arranged in intermingled relationship on the core, and a pair of roller contact rings positioned between the sections of the core and forming terminals for the secondary.

6. A rotary transformer including a core arranged in two spaced sections, primary and secondary windings arranged in intermingled relationship on the core, said windings being in bar form, and a pair of roller contact rings spaced between said core sections and supported by at least a portion of said bars and forming terminals for the secondary.

7. A rotary transformer as set forth in claim 4, further characterized in that the outer turns of the primary pass through but are insulated from said roller rings, while the secondary turns are hollow, and means for passing a cooling fluid at least through them.

8. A rotary transformer including an annular core arranged in two spaced symmetrical sections, bar conductors forming alternate primary and secondary loops around the entire core, a pair of roller contact rings symmetrically spaced between said core sections and forming terminals for the secondary, and means for passing current through the primary.

9. A rotary transformer as set forth in claim 8, further characterized in that said contact rings are supported on the periphery of the inner parts of said conductor loops.

10. A rotary transformer as set forth in claim 8, further characterized in that the said contact rings are supported on the periphery of the inner parts of said conducting loops, and further the secondary conductor loops are hollow, and means for passing a cooling fluid through them.

11. In a rotary welding transformer, an annular core arranged in two sections, a hollow shaft, a chambered disc on the shaft adjacent the outer end of each core section, tubes of different diameters spaced from the shaft and carried by said discs, spacing collars centrally supporting said tubes, primary and secondary conductors looped around the entire core, the inner parts of the secondary loops resting on and contacting with the outer of said tubes and being joined to said discs, the inner parts of the primary loops also resting on said tube but being insulated therefrom, a pair of roller contact rings positioned between the core sections and resting on, but being insulated from said conductor loop parts, and secondary conductor ends extending from said discs to said contact rings which thereby form terminals for the secondary, means for passing current to the primary, and means for passing a cooling fluid to the chambered discs and to the space between said tubes.

12. In a rotary welding transformer, an annular core arranged in two sections, a hollow shaft, a chambered disc on the shaft adjacent the outer end of each core section, tubes of different diameters spaced from the shaft and carried by said discs, spacing collars centrally supporting said tubes, primary and secondary conductors looped around the entire core, the inner parts of the secondary loops resting on and contacting with the outer of said tubes and being joined to said discs, the inner parts of the primary loops also resting on said tube but being insulated therefrom, a pair of roller contact rings positioned between the core sections and resting on, but being insulated from said conductor loop parts, a pair of tubes of different diameter positioned around the outer periphery of the inner portions of said loops and between each core section and each one of said contact rings, said pairs of tubes being fastened to their respective contact rings so as to make a fluid tight joint, means for completely closing the annular space between said pairs of tubes adjacent the core sections, thereby forming a closed chamber between said pairs of tubes, hollow secondary conductor ends extending from said chambered discs over the outer periphery of said core sections and fastened at their opposite ends to the outer of said pairs of tubes so as to complete an electrical and a fluid connection between the chambered discs and the contact rings, means for passing current to the primary, and means for passing a cooling fluid through said chambered discs, the chambers between said pairs of tubes, and to the spaces between the first-mentioned tubes.

13. A rotary welding transformer as set forth in claim 12, further characterized in that the outer parts of the primary loops are intermingled with the hollow secondary conductor ends and pass through, but are insulated from, said contact rings.

14. In a rotary welding transformer, an annular core arranged in two sections, a hollow shaft, a chambered disc on the shaft adjacent the outer end of each core section, tubes of different diameters spaced from the shaft and carried by said discs, spacing collars centrally supporting said tubes, a pair of contact roller rings positioned between said core sections, primary and secondary conductors looped around said core sections, the outer portions of said primary loops passing through said contact rings, but being insulated therefrom, the secondary loops including said discs and terminating in said roller rings, said rings having hollow portions, and those parts of the secondary loops between the discs and contact rings being hollow to form fluid passage-ways, means for passing current to the primary conductors, and means for passing a cooling fluid to the chambered discs, the secondary hollow portions, to the contact rings, and to the spaces between said tubes.

15. A tube welding transformer comprising two symmetrical halves, each including a core section and a contact roller ring, the rings being closely adjacent each other but insulated one from the other, primary and secondary conductors looped in intermingled relationship around the core, the outer portions of the secondary terminating in said contact rings, while the outer portions of the primary loops pass through but are insulated from said rings.

16. A rotary welding transformer as set forth in claim 15, further characterized in that the intermingling of the conductors may be arranged in groups.

17. A rotary welding transformer having a shaft and a pair of contact rollers, annular core sections disposed on opposite sides of said rollers, primary conductors looping around both of said core sections, secondary conductors also looping around both core sections but terminating in said contact rollers, and discs carried by the shaft at opposite ends of the transformer for completing the secondary loops.

18. A rotary transformer including; a two-part annular core, a two-part wheel disposed centrally between the parts of the core but preferably of greater diameter, primary and secondary turns looped around the core, the secondary terminating in the two-part welding wheel.

19. A rotary transformer as set forth in claim 18, further characterized in that the two-part welding wheel is supported by at least some of the looped conductors.

20. A rotary transformer including; an annular core, a two-part chambered wheel centrally disposed with respect to the core but extending beyond the periphery thereof, primary turns looped around the core, a chambered disc positioned adjacent each of the outer ends of the core a pair of spaced annular tubes positioned between and anchored to each half of the wheel, and one of said discs forming the outer part of the secondary winding, said discs and wheel part being provided with openings to cool said chambers, and means for passing cooling fluid through said chambers.

21. A rotary welding transformer including a core arranged in two spaced sections, primary and secondary windings arranged around the core, a two-part electrode wheel built into the transformer between the sections of the core and forming terminals for the secondary, said wheel parts having hollow portions and means for passing cooling fluid through said hollow portions, said wheel parts also being provided with shoes which may be replaced without dismantling the wheel parts from the transformer, and without disturbing the cooling connections to said hollow portions of said wheel parts.

22. A rotary welding transformer having a shaft and a two-part electrode wheel, annular core sections disposed on opposite sides of and enclosing and overlapping at least part of the sides of said wheel thereby preventing the dismantling of the wheel parts without disassembling the cores, primary conductors looped around both of said core sections, secondary conductors also looped around both core sections but terminating in said wheel parts, discs carried by the shafts at opposite ends of the transformer for completing the secondary loops, at least said discs and wheel parts being chambered, and means for passing cooling fluid through all of said chambers, said wheel parts having replaceable shoes which may be dismantled without disturbing the wheel parts or the cooling connections to any of the cooling chambers of the transformer.

In testimony whereof, I affix my signature.

THOMAS M. HUNTER.